United States Patent Office 2,797,521
Patented July 2, 1957

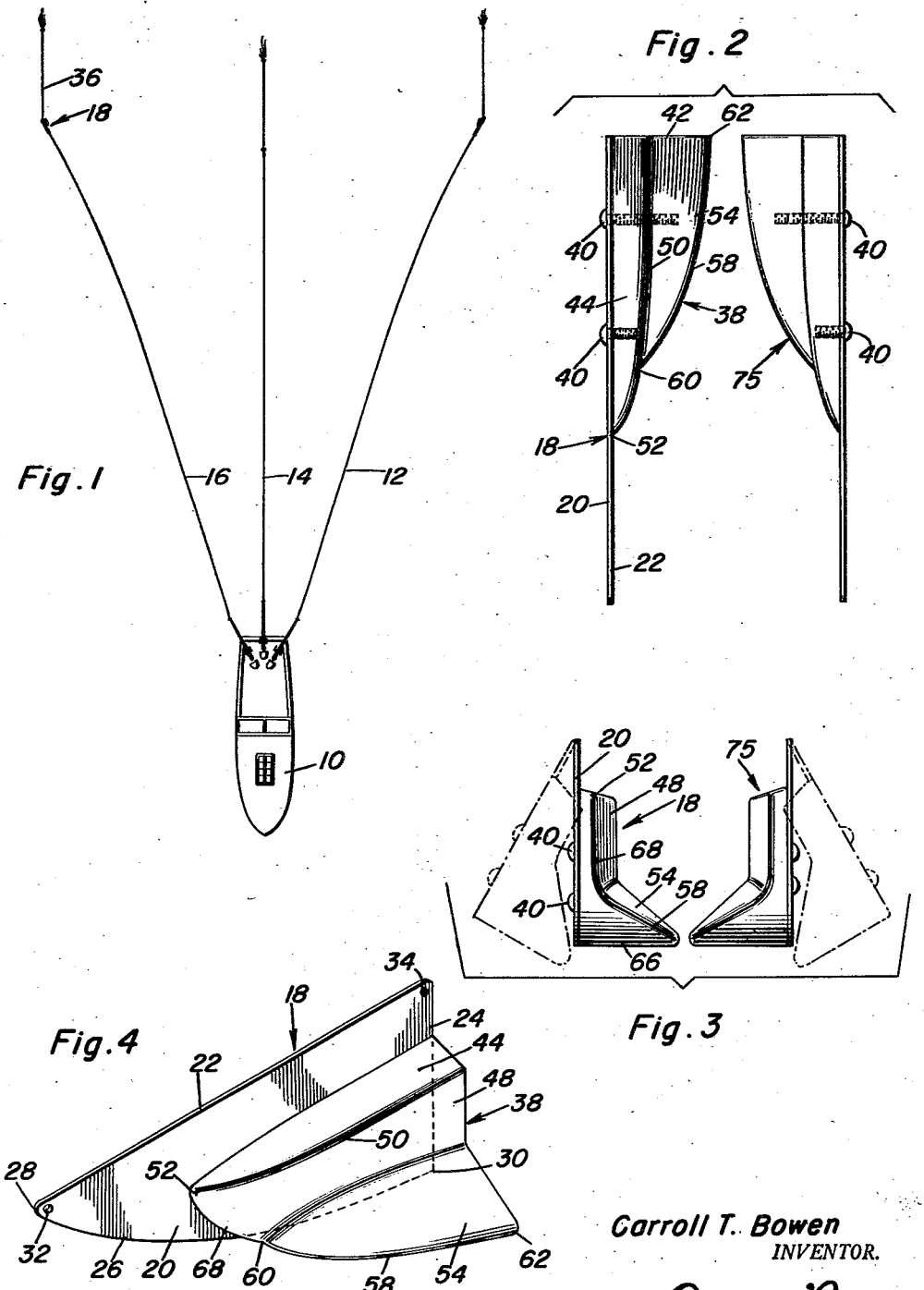

2,797,521

FISHING LINE ATTACHMENT

Carroll T. Bowen, Homestead, Fla.

Application February 3, 1956, Serial No. 563,279

4 Claims. (Cl. 43—43.13)

This invention relates to attachments for fishing lines and particularly to a device for preventing the fishing line from twisting in an unraveling or tightening direction and for preventing a line from becoming entangled with an adjacent line when trolling.

Ordinarily two and sometimes three trolling lines are used at the rear of a boat. It is reasonably safe to use two lines that extend from the stern, but with the third line fouling becomes common. Accordingly, an object of this invention is to provide an attachment for the port and starboard lines which extend from the stern of a boat to prevent those lines from coming together so as to be fouled with each other. A further object is to incorporate in the same attachment means for preventing the lines from becoming twisted in either a clockwise or counterclockwise direction.

The nature of the invention is an attachment which depends on structural configuration making the attachment move in a lateral direction by the hydrodynamic effect of water on the device as it is drawn through the water by the motion of the boat. The result is to keep the lure or bait, usually the former, separated from any adjoining trailing lure to a greater degree than would follow from the parallel trailing of lures behind a boat. Accordingly, the use of this attachment on either side of a trolling boat would more readily permit the safe use of a center trolling line. Moreover, since the attachment directs the port and starboard lines laterally from the direction of travel of the boat, the lure is in the water at a location farther from the wake of the boat for better visibility to the fish.

Other objects and features will become apparent in following the description of the form of the invention illustrated in the accompanying drawing wherein:

Figure 1 is a plan view in cartoon form of the invention in use on a trolling boat;

Figure 2 is a plan view of a set of attachments, one being for the left and the other being for the right lines at the stern of the boat;

Figure 3 is an elevational front view of the attachments in Figure 2; and

Figure 4 is a perspective view of one of the attachments.

In the accompanying drawing there is a boat 10 of standard configuration and form. Three trolling lines 12, 14 and 16 respectively trail boat 10 from the stern thereof. The starboard and port lines are flared outwardly at their trailing ends in a direction laterally spaced from the wake of the boat. Line 14 trails boat 10 and is directly in the wake.

As seen best in Figure 4 the attachment 18 comprises a flat plate 20 having a straight upper edge 22 and a straight rear or trailing edge 24. The final, lower edge 26 is smoothly curved from a point or apex 28 which constitutes a junction with the front of upper edge 22, to the lower part of the rear edge 24, forming a right angular junction 30 therewith. Accordingly, the flat plate 20 is triangular and has two straight sides and one curved side. Aperture 32 at the junction of sides 26 and 22 is used for the purpose of attaching one of the fishing lines, for example fishing line 16 thereto. Aperture 34 at the junction of edges 22 and 24, is used for attaching the bait or lure line to attachment 18, for example lure line 36 in Figure 1.

Weight 38 is attached, as by being bolted at 40, riveted or being integrally formed with plate 20. Weight 38 is located on one side of plate 20 with its rear flat edge 42 flush with the rear edge 24 of plate 20 and its upper surface 44 spaced downwardly from edge 22. Surface 44 slopes downwardly from the face of plate 20 toward the outer wall 48 of weight 38. As seen in Figure 4 the edge 50 at the junction between surface 44 and wall 48 is smoothly curved inwardly to a front, vanishing point 52 at the front of the weight. Point 52 is spaced rearwardly from the apex 28 of plate 20 and located between the upper and lower edges 22 and 26 respectively of plate 20. Surface 54 slopes outwardly and downwardly from wall 48 with the outer edge 58 being smoothly curved in top plan view outwardly from its commencement 60 to its rear end 62 which is coplanar with the back surface 42 of weight 38. The bottom surface 66 of weight 38 is approximately flat while the leading edge 68 of the weight from vanishing point 52 to the commencement point 60 of edge 58 is smoothly flared rearwardly from point 60 to point 62.

In use attachment 18 is connected to the fishing line 16 by means of a standard fastening device such as a ring or snap swivel or the fishing line is tied directly in the aperture 32. The lure or bait line 36 is attached in the aperture 34. Then, as the trolling commences the attachment 18 will tilt in the water as shown in Figure 3. The shape of weight 38 and the plate 18 and the location of the weight 38 on plate 20 is responsible for the application of a lateral thrust to be applied to the line 16 directing it outwardly from the wake of the boat 10. In addition the shape of the attachment provides a stabilizing effect on the line preventing it from rotating in either direction in the water. The attachment 75 is made identical in construction to the attachment 18 but is of the opposite hand for the opposite fishing line 12. Fishing line 14 being centrally located between flanking lines 12 and 16 is best located directly between the lines 12 and 16. Accordingly, it has no attachment thereon since the lines will normally trail the boat 10.

Since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. For use on a fishing line while trolling, a line attachment for preventing the line from twisting in an unravelling or tightening direction and also for preventing the line from becoming entangled with an adjacent line, said attachment comprising a flat plate having an upper edge, and a trailing edge, said edges being at right angles to each other, said plate having a fishing line attachment aperture at its front end and at said upper edge and having a lure or bait line attachment aperture at the junction of said upper and trailing edges, and a weight on one side of said plate located below said upper edge and at said rear edge, the lower edge of said plate being smoothly curved and commencing at a point at said upper edge and terminating at the lower end of said trailing edge.

2. For use on a fishing line while trolling, a line attachment for preventing the line from twisting in an unravelling or tightening direction and also for preventing the line from becoming entangled with an adjacent line, said attachment comprising a flat plate having an upper edge, and a trailing edge, said edges being at right angles to each other, said plate having a fishing line attachment aperture at its front end and at said upper edge and having a lure or bait line attachment aperture at the junction of said upper and trailing edges, and a weight on one side of said plate located below said upper edge and at said rear edge, the lower edge of said plate being smoothly curved and commencing at a point at said upper edge and terminating at the lower end of said trailing edge, said weight having a flat bottom surface and a flat rear surface at said plate lower edge and rear edge respectively, and outwardly and downwardly extending surfaces of said weight protruding from said side of said plate.

3. An attachment for a fishing line to be used while trolling in order to prevent the line from becoming entangled with an adjacent line, said attachment comprising a plate of substantially triangular form and having an upper, a rear and a lower edge, said plate having at its apex between said upper and lower edges an aperture to which the fishing line is adapted to be secured, and another aperture at the junction of said upper and rear edges to which the lure or bait carrying line is adapted to be secured, a weight on one side of said plate and including a side wall which is curved outwardly from a thin leading edge to the rear surface of said weight, said rear surface of said weight being approximately flush with the rear edge of said plate, said leading edge of said wall being smoothly curved downwardly and rearwardly, a top surface on said weight extending inwardly and upwardly from the upper edge of said wall to said plate.

4. An attachment for a fishing line to be used while trolling in order to prevent the line from becoming entangled with an adjacent line, said attachment comprising a plate of substantially triangular form and having an upper, a rear and a lower edge, said plate having at its apex between said upper and lower edges an aperture to which the fishing line is adapted to be secured, and another aperture at the junction of said upper and rear edges to which the lure or bait carrying line is adapted to be secured, a weight on one side of said plate and including a side wall which is curved outwardly from a thin leading edge to the rear surface of said weight, said rear surface of said weight being approximately flush with the rear edge of said plate, said leading edge of said wall being smoothly curved downwardly and rearwardly, a top surface on said weight extending inwardly and upwardly from the upper edge of said wall to said plate, an additional surface at the lower edge of said side wall of said weight, said additional surface extending laterally outwardly and downwardly from said side wall of said weight and having a smoothly curved outer edge.

References Cited in the file of this patent

UNITED STATES PATENTS

| | | |
|---|---|---|
| D. 165,581 | Harris | Jan. 1, 1952 |
| 61,625 | Martin | Jan. 29, 1867 |
| 2,741,863 | Magill | Apr. 17, 1956 |
| 2,749,651 | Snider | June 12, 1956 |

FOREIGN PATENTS

| | | |
|---|---|---|
| 173,140 | Great Britain | Dec. 8, 1921 |